(12) United States Patent
Pauling et al.

(10) Patent No.: US 6,209,704 B1
(45) Date of Patent: Apr. 3, 2001

(54) APPARATUS AND METHOD FOR TRANSPORTING AND REORIENTING ITEMS BETWEEN TWO LOCATIONS

(75) Inventors: Paul Kerner Pauling; Dennis Marvin Jobs; Leslie Thomas Long, all of Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/201,238

(22) Filed: Nov. 30, 1998

(51) Int. Cl.$^7$ .................................................. B65G 15/00
(52) U.S. Cl. .......................... 198/404; 198/408; 198/801; 198/802
(58) Field of Search .............................. 198/469.1, 470.1, 198/801, 404, 408, 802

(56) References Cited

U.S. PATENT DOCUMENTS

| | | | |
|---|---|---|---|
| 1,231,027 | * 6/1917 | Johnson | 198/801 |
| 1,920,981 | * 8/1933 | Gibbs | 198/801 |
| 1,979,553 | * 11/1934 | Hunter | 198/801 |
| 2,430,689 | * 11/1947 | Shook | 198/801 |
| 3,137,396 | * 6/1964 | Winstead | 198/801 |
| 3,456,419 | 7/1969 | Vadas et al. | 53/29 |
| 3,617,054 | 11/1971 | Schilling | 271/69 |
| 3,981,494 | 9/1976 | Prestegaard | 271/10 |
| 4,199,051 | * 4/1980 | Kimberly | 198/469.1 |
| 4,518,156 | 5/1985 | Moser | 270/54 |
| 4,615,521 | 10/1986 | Mori | 272/264 |
| 4,874,077 | 10/1989 | Yaguchi et al. | 198/408 |
| 4,979,862 | 12/1990 | Bartlett et al. | 414/331 |
| 5,031,892 | 7/1991 | Stieger | 271/10 |
| 5,255,773 | * 10/1993 | Pollock | 198/801 |
| 5,354,411 | * 10/1994 | Lines | 198/408 |
| 5,531,432 | 7/1996 | Sardella | 271/10.01 |
| 5,561,968 | 10/1996 | Palmer | 53/458 |
| 5,743,374 | 4/1998 | Monsees | 198/403 |

FOREIGN PATENT DOCUMENTS

| | | | |
|---|---|---|---|
| 0 563 643 A2 | 10/1993 | (EP) . | |
| 996567 | * 6/1965 | (GB) | 198/408 |
| 1578037 A1 | 7/1990 | (SU) . | |

* cited by examiner

*Primary Examiner*—Robert P. Olszewski
*Assistant Examiner*—Steven B. McAllister
(74) *Attorney, Agent, or Firm*—Thomas J. Connelly; Patricia A. Charlier

(57) ABSTRACT

An apparatus and method is disclosed for transporting and reorienting items between two locations. The apparatus includes first and second upstanding members each having a first end and a second end. The first and second upstanding members are joined together at the first ends by a third member to form a frame. A track is formed in the first, second and third members which defines a path which spans at least 180 degrees and a set of four sprockets interact with the track. A movable member is positioned within the track and is looped around the set of four sprockets. An integral carrier is secured to the movable member. The integral carrier includes first and second members each having a first end, and a third member affixed to the first ends of the first and second members to form a nonadjustable, approximately C-shaped configuration wherein the first and second members are permanently spaced apart from one another and aligned in a parallel relationship. A power source is provided for driving one of the sprockets. The power source being activated and deactivated by a controller at set time intervals to transport and reorient the integral carrier between the first and second locations. The method includes the steps of positioning and moving the integral carrier between the first and second locations.

19 Claims, 8 Drawing Sheets

APPARATUS AND METHOD FOR TRANSPORTING AND REORIENTING ITEMS BETWEEN TWO LOCATIONS

FIELD OF THE INVENTION

This invention relates to an apparatus and method for transporting and reorienting items between two locations. More specifically, this invention relates to an apparatus and method for transporting and reorienting one or more cases of cartons from an unload station to a cartoner magazine conveyor.

BACKGROUND OF THE INVENTION

In many manufacturing environments, items need to be transported and reoriented from a first location to a second location. Such a transfer usually requires high repetition and can be manually intensive. In addition, transporting and reorienting items can be physically awkward and/or ergonomically taxing. The use of semi or fully automated systems are advantageous in such circumstances, however, many such systems are very expensive and cost prohibitive. In addition, some semi or fully automated systems are so large and complex that they tend to eliminate or obstruct an operators access to the adjacent machinery. This is undesirable. Furthermore, many of the commercially available semi or fully automated systems on the market today tend to be complex in construction, especially those involving robotics, and they require special maintenance personnel to keep them operating properly. The high cost of these commercially available systems prohibit their use where they are really needed. To further complicate matters, some of the automated systems presently in use today actually restrict or prevent increases in production rates because of the way they are built and/or utilized.

What is needed is an efficient, flexible and economical means for transporting and reorienting items between two locations which is constructed such that an operator's access to the equipment located on either side of the transfer mechanism is not obstructed. Furthermore, the equipment should be designed such that it has few moving parts and is inexpensive. It is also advantageous to be able to shut down the equipment without removing it so as to revert back to manual operation if necessary.

Now an apparatus and method for transporting and reorienting items between two locations has been invented which is simple, inexpensive and will not limit production rates. The apparatus and method can also be turned off so that the automatic operation can revert to manual operation without physically removing the equipment. The apparatus can also be easily integrated into very confined areas.

SUMMARY OF THE INVENTION

Briefly, this invention relates to an apparatus and method for transporting and reorienting items between two locations. The apparatus includes first and second upstanding members each having a first end and a second end. The first and second upstanding members are joined together at the first ends by a third member to form a frame. A track is formed in the first, second and third members which defines a path which spans at least 180 degrees and a set of four sprockets interact with the track. A movable member is positioned within the track and is looped around the set of four sprockets. An integral carrier is secured to the movable member. The integral carrier includes first and second members each having a first end, and a third member affixed to the first ends of the first and second members to form a nonadjustable, approximately C-shaped configuration wherein the first and second members are permanently spaced apart from one another and aligned in a parallel relationship. A power source is provided for driving one of the sprockets. The power source is activated and deactivated by a controller at set time intervals to transport and reorient the integral carrier between the first and second locations.

The method includes the steps of positioning and moving the integral carrier between the first and second locations.

The general object of this invention is to provide an apparatus and method for transporting and reorienting item between two locations. A more specific object of this invention is to provide an apparatus and method for transporting and reorienting one or more cases of cartons from an unload station to a cartoner magazine conveyor.

Another object of this invention is to provide a simple apparatus which is inexpensive to build and contains few moving parts for transporting and reorienting item between two locations.

A further object of this invention is to provide an apparatus which is flexible and can be integrated into very confined areas and which can transport and/or reorient items between two locations.

Still another object of this invention is to provide an apparatus and method for transporting and reorienting item between two locations which also does not restrict an operator from gaining access to the equipment located on either side of and/or in front of the automated apparatus.

Still further, an object of this invention is to provide an apparatus and method for transporting and reorienting item between two locations which reduces and/or eliminates ergonomic risks to an operator, such as repetitive maneuvers involving lifting, turning, rotating or rearranging items.

Other objects and advantages of the present invention will become more apparent to those skilled in the art in view of the following description and the accompanying drawings.

DETAILED DESCRIPTION OF THE PREFERRED EMBODIMENTS

Figure 1:
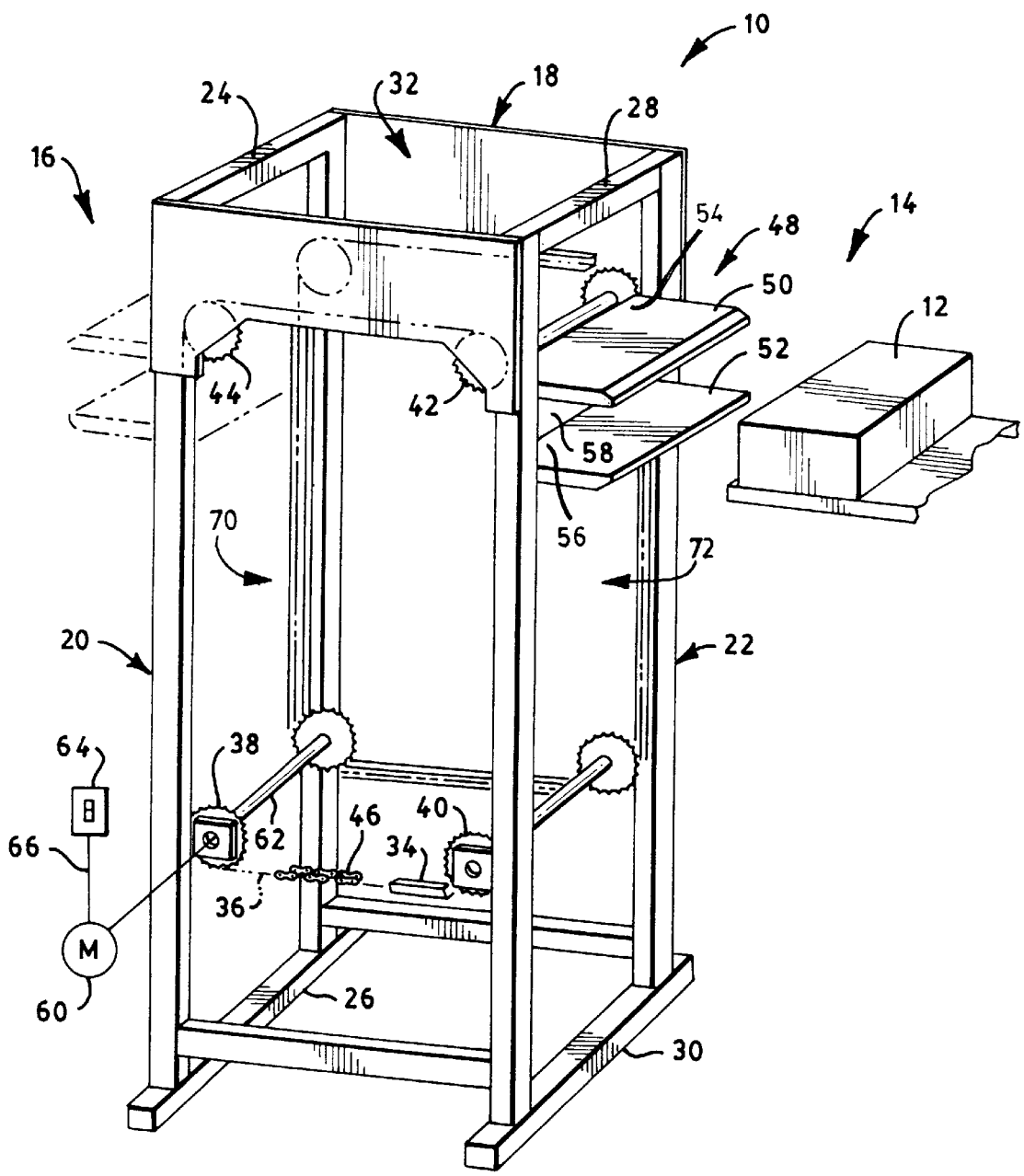
FIG. 1 is a perspective view of an apparatus for transporting and reorienting items between two locations.

Referring to FIG. 1, an apparatus 10 is shown which is capable of transporting and reorienting items 12 between a first location 14 and a second location 16. The word "transporting" is used throughout this specification to include transporting, conveying or moving one or more of the items 12 or cases of the items 12 between the two spaced apart locations 14 and 16. The word "reorienting" is used throughout this specification to include realigning, repositioning, turning, flipping, orienting, lifting, reversing direction, etc. of one or more of the items 12 or cases of the items 12 from an initial position or location.

The apparatus 10 comprises a frame 18 made up of first and second upstanding members, 20 and 22 respectively, each having a first end, 24 and 28 respectively, and a second end 26 and 30 respectively. The words "comprises and comprising" are used throughout this application as having a definition synonymous with the words "includes and including" respectively. The frame 10 also includes a third member 32 which is joined to the first ends 24 and 28 of the first and second upstanding members, 20 and 22 respectively. The frame 10 can be constructed out of almost any kind of material with metal, aluminum and commercially available metal alloys being preferred. However, wood, plastic, thermoplastic, fiberglass, graphite, etc. can also be used.

Figure 2:
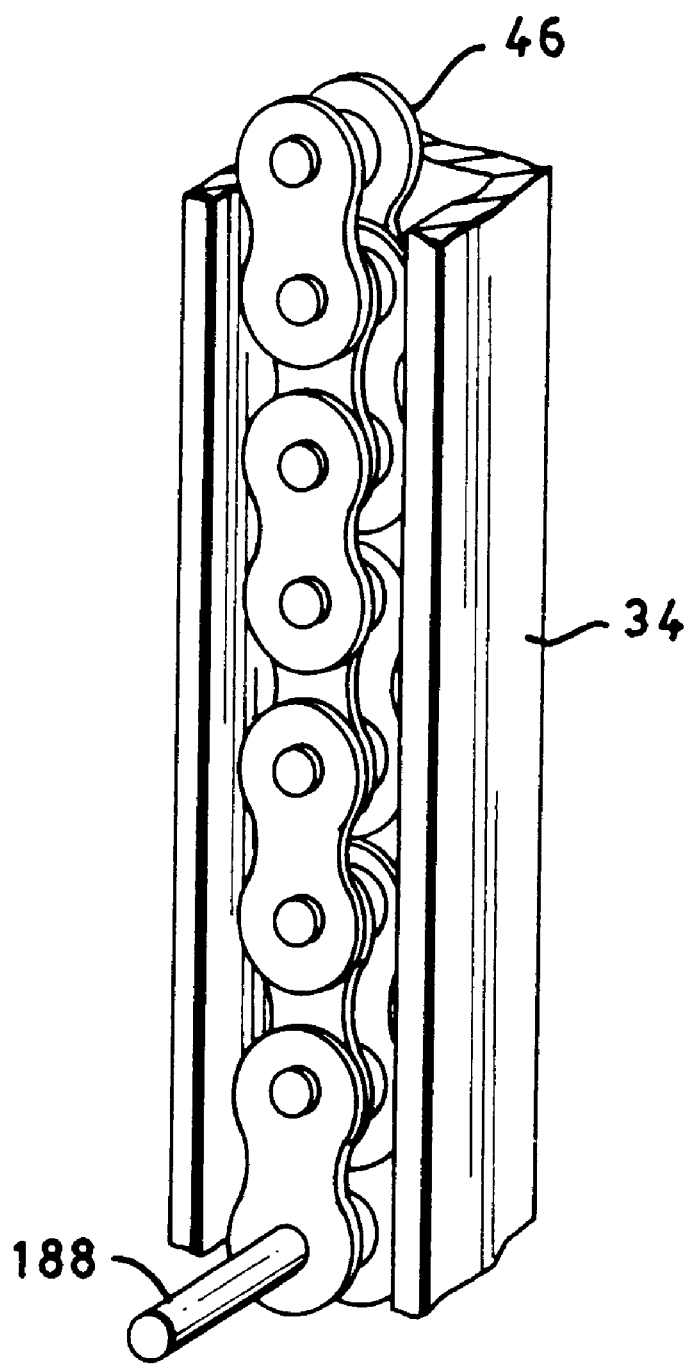
FIG. 2 is a perspective view of a section of roller chain positioned in a guide track.

Referring to FIGS. 1 and 2, a track 34 is formed in the first and second upstanding members, 20 and 22 respectively, as well as in the third member 32. The track 34 defines a path 36 which spans at least 180 degrees and preferably 360 degrees. In FIG. 1, the path 36 actually passes through four 90 degree bends which equals 360 degrees. The track 34 can be rectangular, square, semi-circular or U-shaped in configuration. In FIG. 2, the track 34 is shown as a three sided member having a rectangular configuration with one open side or surface. Interacting with the track 34 is a set of four sprockets 38, 40, 42 and 44. The sprockets 38, 40, 42 and 44 are rotatable and can be formed as a ring or disc having a plurality of gear teeth formed on it's outer circumference. Alternatively, the sprockets 38, 40, 42 and 44 can be any various toothlike projections arranged on a wheel rim to engage the links of a chain.

A movable member 46 is positioned in the track 34 and is looped about the set of four sprockets 38, 40, 42 and 44. The movable member 46 can be a chain, preferably a roller chain. The movable member 46 can also be a belt or cable. When the movable member 46 is a belt or cable, the set of four sprockets 38, 40, 42 and 44 can be modified to accommodate the different physical structure of the movable member 46. Most preferably, the movable member 46 is a continuous chain which is connected to itself to form a closed loop. The movable member 46 should be assembled about the set of our sprockets so that it is tightly positioned there about so that as one of the our sprockets 38, 40, 42 and 44 rotates, it will cause the movable member 46 to move.

An integral carrier 48 is secured to the movable member 46. Preferably, the integral carrier 48 is attached by a mechanical connection which will allow the integral carrier 48 to follow the movable member 46 around turns, corners and arcs of 90 degrees or more. The integral carrier 48 includes first and second members, 50 and 52 respectively, each having a first end, 54 and 56 respectively. The integral carrier 48 also includes a third member 58 which is affixed to the first ends 54 and 56 of the first and second members, 50 and 52 respectively, to form a nonadjustable, approximately C-shaped configuration. The first and second members, 50 and 52 respectively, are permanently spaced apart from one another and are aligned in a parallel relationship. The integral carrier 48 can have a square, rectangular or other type of configuration if desired. The phrase "approximately C-shaped configuration" is contemplated to include such other configurations as well as other designs which provide a C or U-shaped profile. The integral carrier 48 is a C-shaped container having three open sides and the three members 50, 52 and 58 are not movable relative to one another.

The integral carrier 48 can be sized and constructed according to the kind of items it is intended to transport and reorient. For the application of transporting and reorienting cases of cardboard cartons which can be used to package facial tissue, the integral carrier 48 should be constructed such that the first and second members, 50 and 52 respectively, will each have a length which is greater than the length of the third member 58. For example, the first and second members, 50 and 52 respectively, should extend outward from the third member 58 by a distance of at least about 15 inches (about 381 millimeters), preferably at least about 20 inches (about 508 mm), and most preferably, by at least about 24 inches (about 610 mm). The first and second members, 50 and 52 respectively, should also be separated from one another by a distance of at least about 10 inches (about 254 mm), preferably by a distance of between about 12 inches (about 305 mm) to about 24 inches (about 610 mm), and most preferably, by a distance of at least 12 inches. It is important to note that the distance separating the first and second members, 50 and 52 respectively, should be less than the distance the first and second members, 50 and 52 respectively, extend outward from the third member 58. This construction will produce an integral carrier 48 which has the ability to transport as well as reorient items 12 in a simple, efficient and economical fashion.

The apparatus 10 further includes a power unit 60 which is capable of driving one of the sprockets 38, 40, 42 or 44. The power unit 60 can be a mechanical, electrical, hydraulic, or pneumatic motor or it could be a gasoline or diesel engine. In FIG. 1, the power unit 60 is shown being physically connected to the sprocket 38 via an output shaft 62. The power unit 60 can be designed to run on direct current or alternating current. The power unit 60 is electrically connected to a controller 64 by an electrical lead or wire 66. The controller 64 can be designed to activate and deactivate the power unit 60 at set time intervals so as to rotate the sprocket 38. As the sprocket 38 is rotated, the movable member 48 will be moved in either a clockwise or counter clockwise direction and move the integral carrier 48 with it. In FIG. 1, with the integral carrier 48 positioned at the first location 14, cases 12 of items 12 are loaded into the C-shaped member by an automatic loading mechanism (not shown). The controller 64 is then turned on to activate the power unit 60 which in turn rotates the output shaft 62 so as to turn the sprocket 38. As the sprocket 38 rotates, the movable member 48 will move in a counter clockwise direction and transport the integral carrier 48 along with it's cargo to the second location 16.

The apparatus 10 can optionally include a platform 68 upon which a human operator can stand. The platform 68 can be free standing or it can be securely attached in a horizontal plane to the first and second upstanding members, 20 and 22 respectively. Alternatively, the platform 68 can be movably attached so as to be adjustable relative to the first and second upstanding members, 20 and 22 respectively. When the platform 68 is mounted so as to be vertically movable, it's distance relative to the third member 32 can be altered. The platform 68 is normally positioned so that a human operator can stand on the platform 68 without hitting his or her head on the third member 32. The platform 68 ensures that an operator carry out the transfer and reorientation procedures should, for some reason, the apparatus 10 does not work or is shut down for repair.

Windows 70 and 72 can be formed in the first and second upstanding members 20 and 22 respectively, which will allow the operator to have access to the items present at the first location 14 and be able to transport them to the second location 16. The windows 70 and 72 can be equipped with safety doors (not shown) made out of a clear material, such as glass of plastic if desired. The safety doors are also useful in preventing an injury to the operator when the carrier 48 is in operation.

Figure 3:
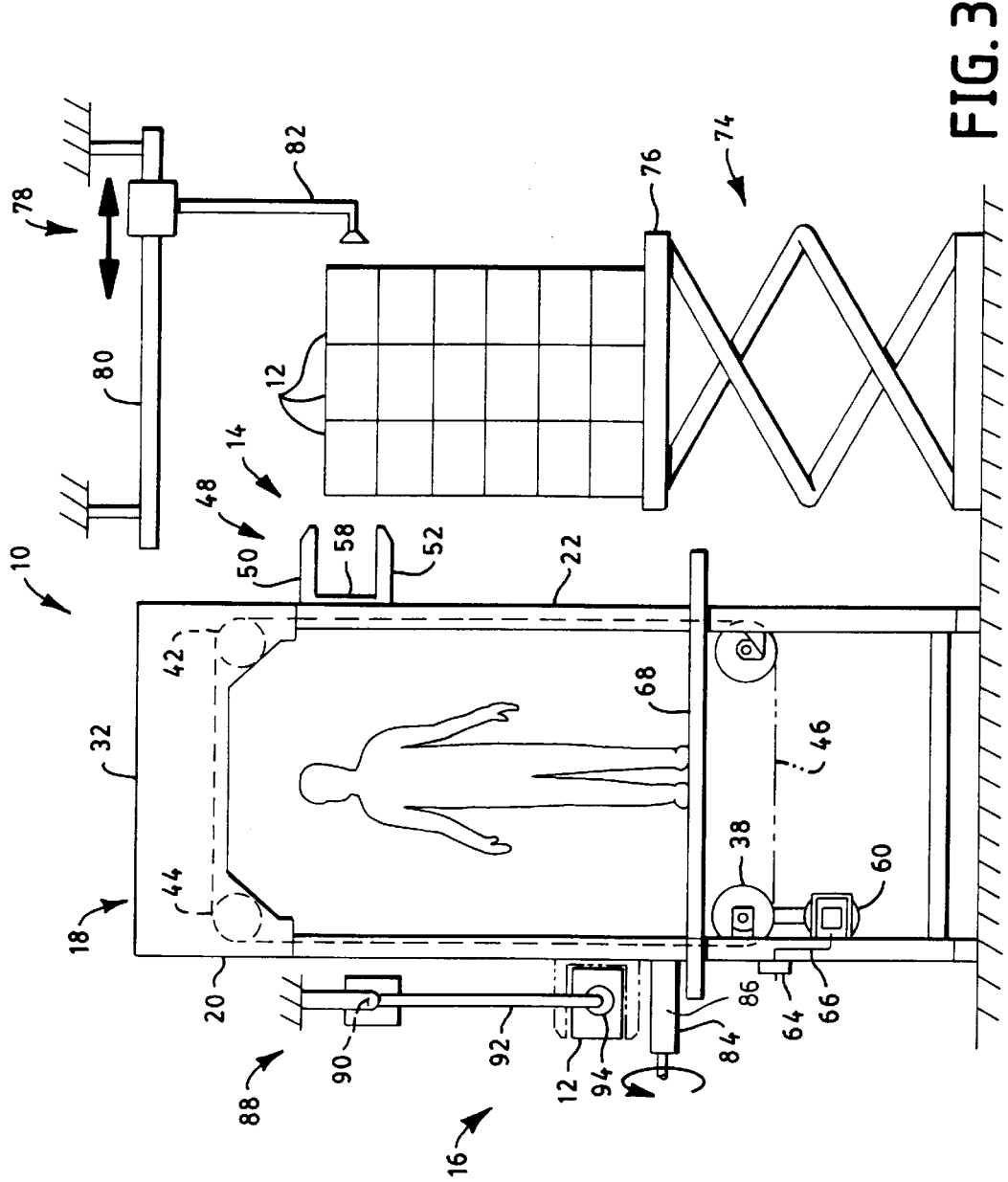
FIG. 3 is a plan view of the apparatus shown in FIG. 1 and arranged between a first work station and a second work station.

Referring to FIG. 3, the transporting and reorienting apparatus 10 is shown arranged and aligned between the first location 14 and the second location 16. At the first location 14, a first mechanism 74 is depicted having a platform 76 which can be vertically elevated and positioned relative to the carrier 48. A plurality of the items 12 are arranged on the platform 76 so that they can be easily pushed or slid into the carrier 48. In FIG. 3, the items 12 are depicted as cases of cardboard cartons which have been collapsed into a flat state. The cardboard cartons will later be expanded and filled with facial tissue. The ends of each carton will then have glue applied to them and be sealed to form a rectangular box. It should be noted that the items 12 can include almost any conceivable article or thing, including but not limited to, packaging materials, parts, assemblies, finished products, etc.

In FIG. 3, one or more cases of the cartons 12, preferably two cases of cartons, are horizontally and/or laterally moved into alignment with the carrier 48 by a loading mechanism 78. The loading mechanism 78 can move horizontally on a rail 80 and has an arm 82 which can slide or push the required number cases of cartons 12 into the carrier 48. The loading mechanism can be mounted overhead in a similar fashion as an overhead crane. It should be noted that the first mechanism 74 and the loading mechanisms 78 can be replaced which other types of equipment which can carry out the intended purpose as explained above. Alternatively, the items 12 can be manually loaded into the carrier 48 by a human operator if so desired.

Once the carrier 48 is loaded, the power unit 60 is activated by the controller 64 which will cause the carrier to move in a counter clockwise direction. The carrier 48 will move upward around the sprocket 42 and be reoriented 90 degrees. The carrier 48 will then move horizontally to the left toward the sprocket 44. At this point, the carrier 48 will reorient another 90 degrees and travel downward until it is aligned with the second location 16. Even though the cases of cartons 12 are inverted by the reorientation of the carrier 48, the cartons themselves will be kept together because the first and second members 50 and 52 of the carrier 48 will be spaced apart a predetermined distance. This predetermined distance will prevent the cartons 12 from exiting the cases themselves.

Referring again to FIG. 3, the items 12 which have been transferred and inverted are unloaded from the carrier 48 at the second location 16 onto a cartoner magazine conveyor 84. The cartoner magazine conveyor 84 has a plurality of cylindrical rollers 86 to facilitate transport of the cases of cartons to the next operation. It should be noted that when using rollers 86, a moving belt or covering is needed to keep the cartons in the cases since each case is oriented upside down. The cases of cartons 12 can be unloaded onto the conveyor 84 by an unloading mechanism 88. One method of removing the cartons is to push the cases out of the carrier 48. Alternatively, the unloading mechanism 88 can move horizontally on a rail 90 and has an arm 92 which can slide or pull the required number of cases of cartons 12 out of the carrier 48. For example, the arm 92 can have a suction cup 94 which can temporarily attach to each case of cartons 12 and pull it out of the carrier 48. The unloading mechanism 88 can be mounted overhead in a similar fashion as an overhead crane.

Figure 4:
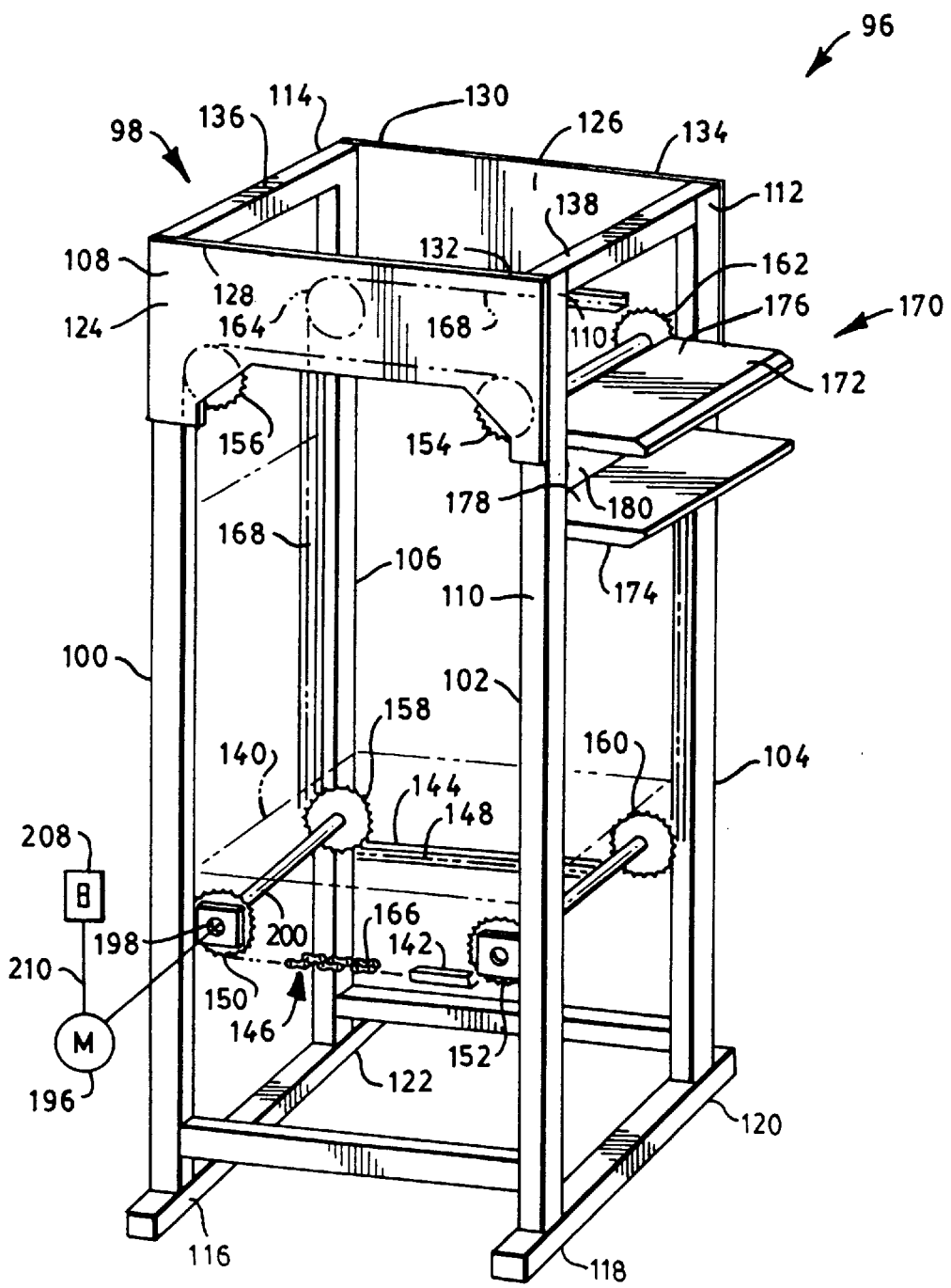
FIG. 4 is a perspective view of an alternative embodiment of an apparatus for transporting and reorienting items between two locations.

Referring to FIG. 4, a second embodiment of an apparatus 96 for transporting and reorienting items between two locations is shown. The apparatus 96 includes a frame 98 having first, second, third and fourth upstanding members, 100, 102, 104 and 106 respectively. Each of the four upstanding members, 100, 102, 104 and 106 respectively, has a first end 108, 110, 112 and 114 respectively, and a second end 116, 118, 120 and 122 respectively. The first and second upstanding members, 100 and 102 respectively, being joined together at their first ends, 108 and 110 respectively, by a fifth member 124 and the third and fourth upstanding members, 104 and 106 respectively, being joined together at their first ends 112 and 114 by a sixth member 126. The fifth and sixth members, 124 and 126 respectively, each having a first end 128 and 130 respectively, and a second end 132 and 134 respectively. A seventh member 136 joins the first end 128 of the fifth member 124 to the first end 130 of the sixth member 126 and an eighth member 138 joins the second end 132 of the fifth member 124 to the second end 134 of the sixth member 126. This framework 98 forms a parallelogram.

A horizontal platform 140 is secured to the first, second, third and fourth upstanding members, 100, 102, 104 and 106 respectively. The platform 140 is located closer to the second ends 116, 118, 120 and 122 of the first, second, third and fourth upstanding members, 100, 102, 104 and 106 respectively, than to the first ends 108, 110, 112 and 114 respectively. The platform 140 is sized to support a human operator and is spaced a sufficient distance away from the fifth, sixth, seventh and eighth members, 124, 126, 136 and 138 respectively, so as to enable an operator to stand erect on the platform 140 without hitting his or her head.

The apparatus 96 also includes a pair of tracks 142 and 144 formed in the first, second, third, fourth, fifth and sixth members, 100, 102, 104, 106, 124 and 126 respectively, which define a pair of paths 146 and 148. Each of the pair of paths 146 and 148 span at least 180 degrees and preferably 360 degrees. The pair of tracks 142 and 144 extend below the platform 140 and preferably to about the second ends 116, 118, 120 and 122 of the first, second, third and fourth upstanding members, 100, 102, 104 and 106 respectively. This arrangement will allow the platform 140 to be moved vertically relative to the first, second, third and fourth upstanding members, 100, 102, 104 and 106 respectively, without being restricted by the length of the pair of tracks 142 and 144.

The apparatus 96 further includes two sets of four sprockets. The first set has four sprockets 150, 152, 154 and 156 and the second set has four sprockets 158, 160, 162 and 164. The first set of four sprockets 150, 152, 154 and 156 interact with the track 142 while the second set of four sprockets 158, 160, 162 and 164 interact with the track 144. One sprocket 150 and 158 of each set is a drive sprocket while the remaining three sprockets of the first set 152, 154 and 156 and the remaining three sprockets of the second set 160, 162 and 164 can be idler tension sprockets.

It should be noted that two sprockets 150 and 152 of the first set of sprockets and sprockets 158 and 160 of the second set of sprockets can be positioned below the platform 140.

This arrangement will ensure that fewer moving parts are likely to be in direct contact with an operator and therefore presents a safer environment. In addition, it is preferable to keep the two drive sprockets 150 and 158 below the platform 140 so that the power source and connecting shafts do not have to extend beyond or through the platform 140.

Figure 5:
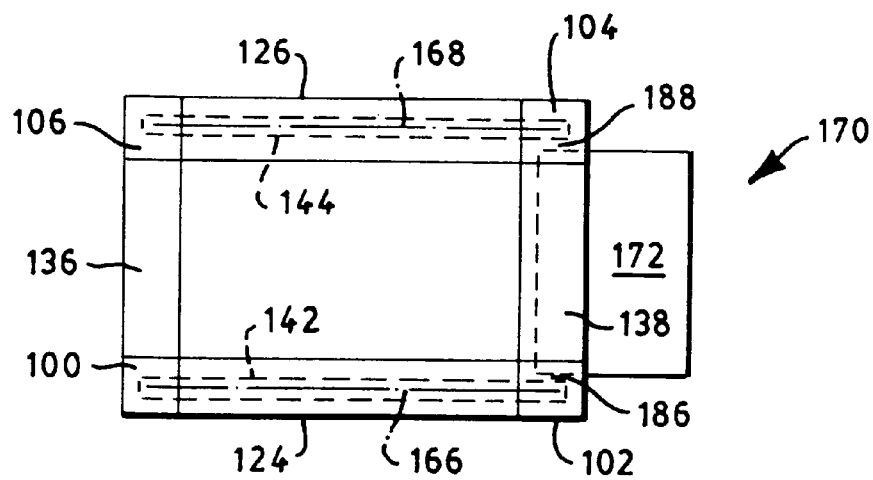
FIG. 5 is a top view of the apparatus depicted in FIG. 3.
Figure 6:
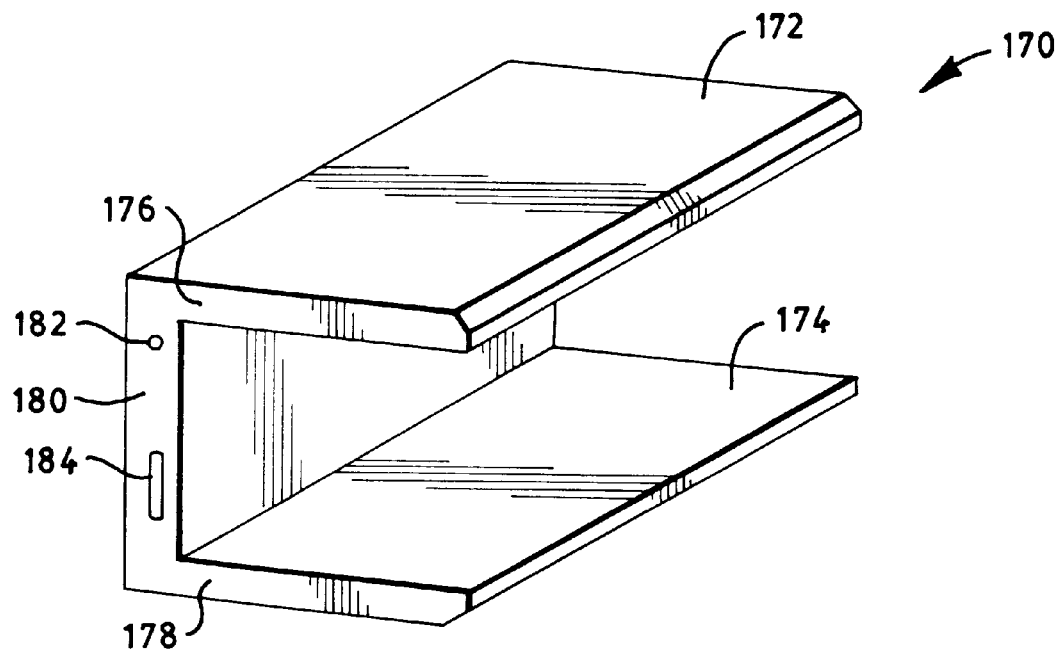
FIG. 6 is a perspective view of the integral carrier.
Figure 7:
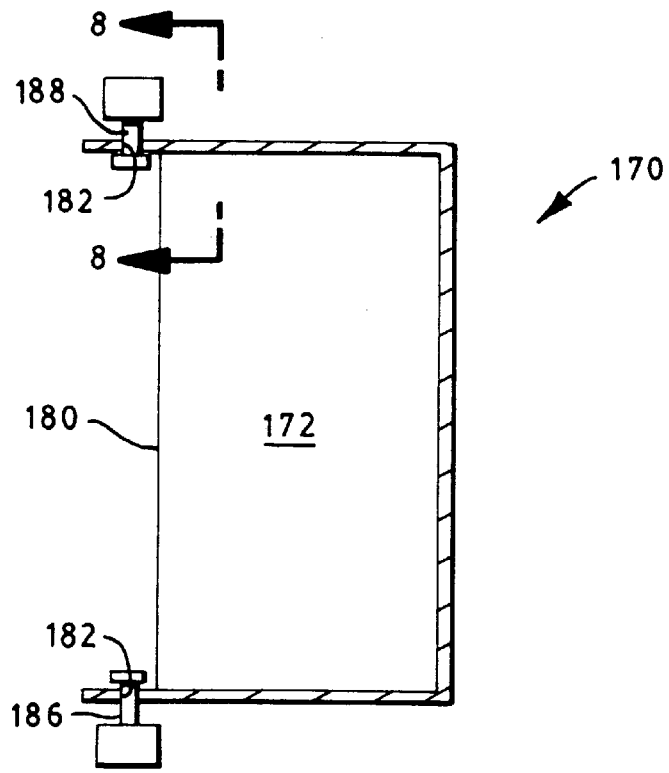
FIG. 7 is a top view of the integral carrier.
Figure 8:
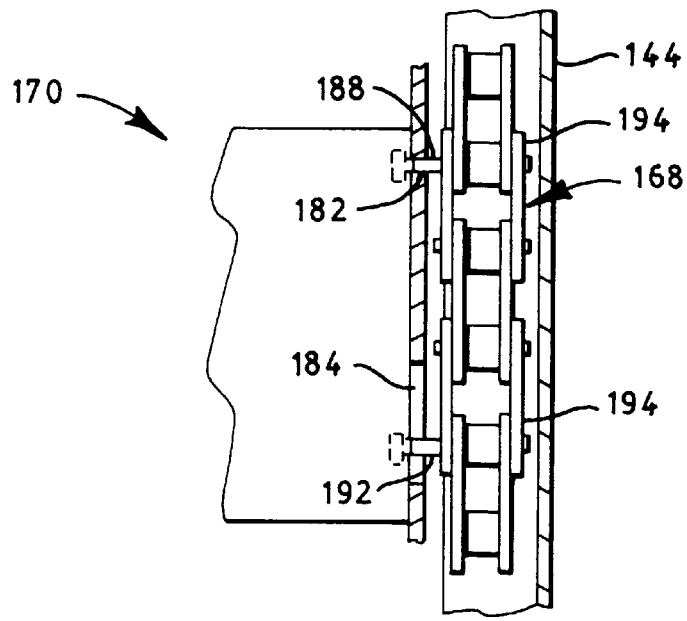
FIG. 8 is a cross-sectional view of the integral carrier shown FIG. 7 taken along line 8—8.

Referring to FIGS. 4 and 5, a pair of movable members 166 and 168 are shown positioned in the pair of tracks 142 and 144. The movable member 166 is movably positioned in the track 142 while the movable member 168 is movably positioned in the track 144. Each movable member 166 and 168 engages on of the sets of four sprockets to form a continuous closed loop. Each of the pair of movable members 166 and 168 can be a chain, preferably a roller chain. Each movable member 166 and 168 can also be a belt or cable. When each of the pair of movable members 166 and 168 is a belt or cable, the two sets of four sprockets can be modified to accommodate the different physical structure of the pair of movable members 166 and 168. Most preferably, each of the movable members 166 and 168 is a continuous chain which is connected to itself to form a closed loop. Each of the pair of movable members 166 and 168 should be assembled about one of the two sets of four sprockets so that it is tightly positioned thereabout so that as the drive sprockets 150 and 158 rotate, they will cause the movable members 166 and 168 to move. The tension in each of the pair of movable members 166 and 168 can be adjusted by one or more of the remaining three sprockets 152, 154 and 156 of the first set of sprockets and by one or more of the remaining three sprockets 160, 162 and 164 of the second set of sprockets.

Referring now to FIGS. 4–8, the apparatus 96 also includes an integral carrier 170 which is secured to the pair of movable members 166 and 168. Preferably, the integral carrier 170 is attached by a mechanical connection which will allow the integral carrier 170 to follow the pair of movable members 166 and 168 around turns, comers and arcs of 90 degrees or more. The integral carrier 170 includes first and second members, 172 and 174 respectively, each having a first end, 176 and 178 respectively. The integral carrier 170 also includes a third member 180 which is affixed to the first ends 176 and 178 of the first and second members, 172 and 174 respectively, to form a nonadjustable, approximately C-shaped configuration. The first and second members 172 and 174 are permanently spaced apart from one another and are aligned in a parallel relationship. The integral carrier 170 can have a square, rectangular or other type of configuration if desired. The phrase "approximately C-shaped configuration" is contemplated to include such other configurations as well as other designs which provide a C- or U-shaped profile. The integral carrier 170 is a C-shaped container having three open sides and the three members 172, 174 and 180 are not movable relative to one another.

The integral carrier 170 can be sized and constructed according to the kind of items it is intended to transport and reorient. For the application of transporting and reorienting cases of cardboard cartons which can be used to package facial tissue, the integral carrier 170 should be constructed such that the first and second members, 172 and 174 respectively, will each have a length which is greater than the length of the third member 180. For example, the first and second members, 172 and 174 respectively, should extend outward from the third member 180 by a distance of at least about 15 inches (about 381 millimeters), preferably by at least about 20 inches (about 508 mm), and most preferably, by at least about 24 inches (about 610 mm). The first and second members, 172 and 174 respectively, should also be separated from one another by a distance of at least about 10 inches (about 254 mm), preferably by a distance of between about 12 inches (about 305 mm) to about 24 inches (about 610 mm), and most preferably, by a distance of at least about 12 inches (about 305 mm). It is important to note that the distance separating the first and second members, 172 and 174 respectively, should be less than the distance the first and second members, 172 and 174 respectively, extend outward from the third member 180. This construction will produce an integral carrier 170 which has the ability to transport as well as reorient items in a simple, efficient and economical fashion.

Referring to FIGS. 5–8, the third member 180 of the integral carrier 170 contains a pair of apertures 182 and a pair of distally spaced slots 184 (one of which is shown). One of the pair of apertures 182 and one of the pair of slots 184 are formed on each side of the integral carrier 170. Each aperture 182 is vertically aligned relative to a corresponding slot 184 with the apertures 182 being formed closer to the first member 172 and the slots 184 being formed closer to the second member 174. The pair of apertures 182 are sized to receive a pair of outward extending pins 186 and 188 and the pair of slots 184 are sized to receive a pair of outwardly extending pins 190 and 192. Two of the pins 186 and 190 are secured to the movable member 166 and the other two pins 188 and 192 are secured to the other movable member 168. For example, when the pair of movable members 166 and 168 are roller chains containing a plurality of links 194, a pin 186 or 188 can be affixed to a first link 194 and a second pin 190 or 192 can be affixed to a second link 194 which is spaced apart from the first link 194. The pins 186, 188, 190 and 192 are secured to the integral carrier 170 such that the pins 190 and 192 which are arranged in the slots 184 are initially located at about the center of the slots 184 and can move up or down within the slots 184. This arrangement will allow the integral carrier 170 to follow the pair of movable members 166 and 168 around a turn or arc, such as the 90 degree bend around the sprockets 154, 156, 162 and 164, see FIG. 4. As the pair of pins 186 and 190 and 188 and 192 move closer to one another as the chains 166 and 168 transcribe the 90 degree arc, the pins 190 and 192, which are positioned within the slots 184 will be able to move within the slots 184 without bending or breaking. This particular arrangement of the pins 186, 188, 190 and 192 engaging in a pair of apertures 182 and engaging in a pair of slots 184 enables the integral carrier 170 to follow the movable members 166 and 168 through a predetermined path of at least 180 degrees and preferably through a path of 360 degrees.

Returning to FIG. 4, the apparatus 96 further includes a power unit 196 which is capable of driving the two drive sprockets 150 and 158. The power unit 196 can be a mechanical, electrical, hydraulic, or pneumatic motor or it could be a gasoline or diesel engine. The power unit 196 is physically connected to the drive sprocket 150 via an output shaft 198. In turn, the first drive sprocket 150 of the first set of sprockets is connected to the drive sprocket 158 of the second set of sprockets by a connecting shaft 200. This arrangement permits the two drive sprockets 150 and 158 to be rotated simultaneous and in the same direction.

Figure 9:
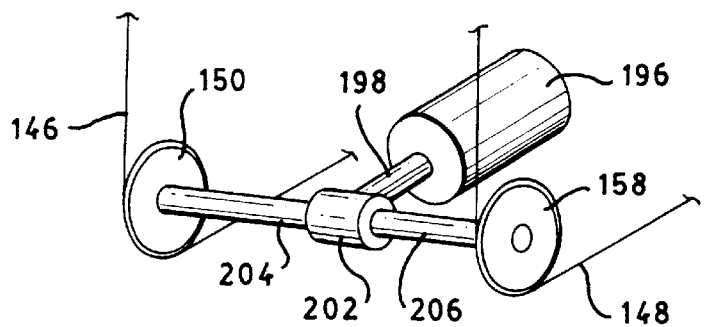
FIG. 9 is a perspective view of a motor and differential simultaneously driving a pair of drive sprockets.

An alternative drive arrangement is depicted in FIG. 9 wherein the power unit 196 is connected to a differential 202 by the output shaft 198. In turn, two connecting shafts 204 and 206 extend outward in opposite directions from the differential 202 and are connected to the two drive sprockets, 150 and 158 respectively. When the drive sprockets 150 and 158 are rotated in either a clockwise or counter clockwise direction, they will cause the movable members 166 and 168 to move around the remaining sprockets 152, 154, 156, 160, 162 and 164. The movement of the movable members 168 and 168 will cause the integral carrier 170 to move from one location to another location.

Returning again to the power unit 196, it can be designed to run on direct current or alternating current. The power unit 196 is electrically connected to a controller 208 by an electrical lead or wire 210. The controller 208 can be designed to activate and deactivate the power unit 196 at set time intervals so as to rotate the two drive sprockets 150 and 158. As the two drive sprockets 150 and 158 are rotated, the pair of movable members 166 and 168 will progress in either a clockwise or counter clockwise direction and move the integral carrier 170 with it. In FIG. 4, with the integral carrier 170 is shown positioned on the right side of the apparatus 96 which can be equated to a first location. Here, the integral carrier 170 can be loaded with items which are to be transported and reoriented to a second location, for example a point located on the left side of the apparatus 96. At the second location, the items can be unloaded. Because of the construction of the apparatus 96, the integral carrier 170 and the items contained therein will be inverted between the first and second locations.

The controller 208 activates the power unit 196 which in turn rotates the output shaft 198 so as to turn the two drive sprockets 150 and 158. As the two drive sprockets 150 and 158 rotate, the pair of movable members 166 and 168 will move in a desired direction and transport the integral carrier 170 along with its cargo to another location.

Figure 10:
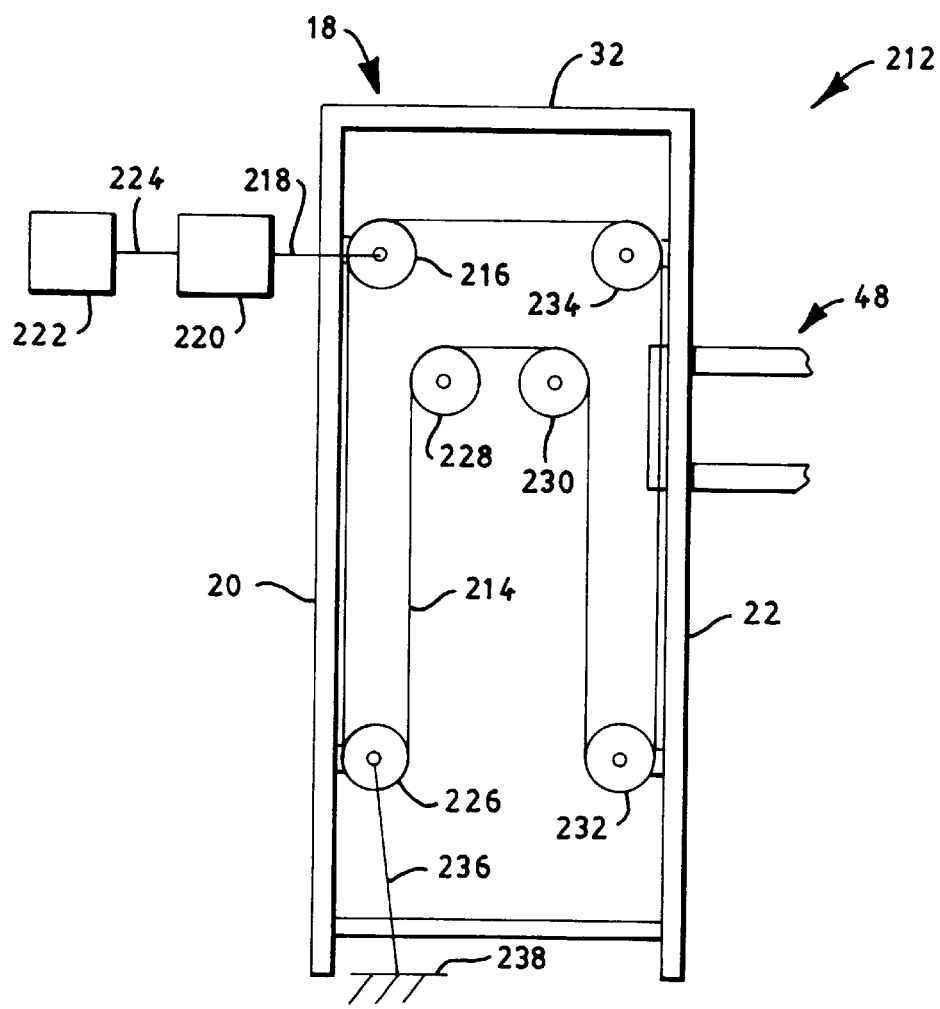
FIG. 10 is an alternative arrangement for forming a continuous movable member incorporating a tensioner.

Referring to FIG. 10, an alternative arrangement 212 is shown for forming a continuous movable member 214 that does not extend across the bottom surface of the frame 18. The movable member 214 can be a chain, roller chain, belt, cable, etc. as was explained supra. The arrangement 212 includes a drive sprocket 216 which is connected via an output shaft 218 from a power unit 220. The power unit 220 is activated and deactivated by a controller 222 electrical connected to the power unit 220 by an electrical lead or wire 224. Besides the drive sprocket 216, the arrangement 212 includes five idler sprockets 226, 228, 230, 232 and 234 and a tensioner 236 physically connected to one of the five sprockets 226, 228, 230, 232 and 234. The tensioner 236 is in turn fastened to an immovable structure 238, like a frame member, a footing 238, etc. The tensioner 236 can be attached to any one of the five sprockets 226, 228, 230, 232 and 234 and serves to maintain a desired tension in the movable member 214. The arrangement 212 is beneficial in that the movable member 214 does not travel horizontally between the sprockets 226 and 232 and therefore, if one desires to eliminate the platform 68, no moving parts will be present in the area in which the human operator is supposed to stand.

One will notice that the six sprockets 216, 226, 228, 230, 232 and 234 are all of the same diameter and are arranged so that the movable member 214 will make right angles. This is beneficial in maintaining proper tension within the movable member 214 as well as fitting the arrangement 212 into the framework 18. However, limited modifications and alterations can be made to the spacing and alignment of the sprockets 216, 226, 228, 230, 232 and 234 without materially affecting the function of the movable member 214.

METHOD

Figure 11:
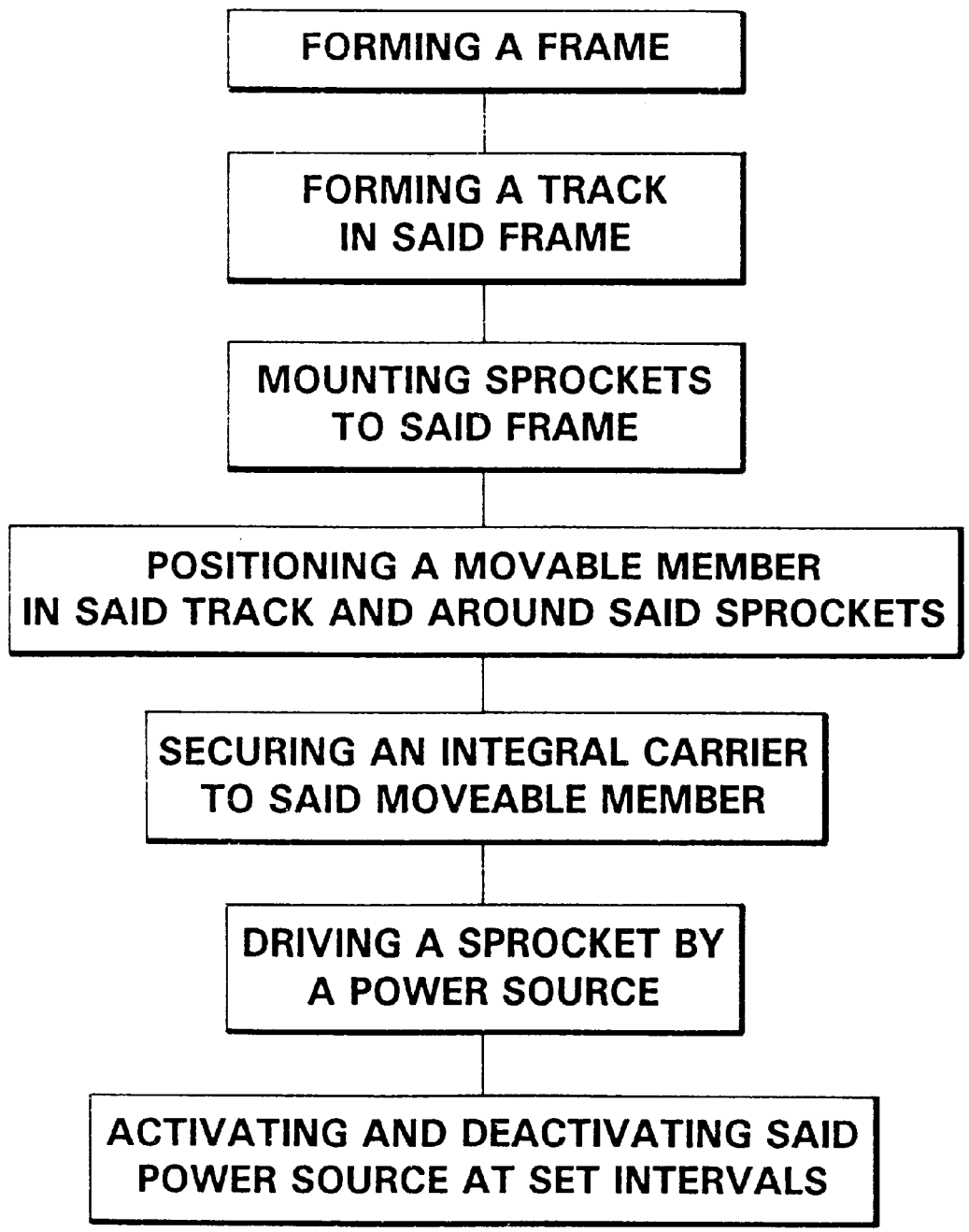
FIG. 11 is a flow diagram depicting the steps of the method for transporting and reorienting items between two locations.

Referring to FIG. 11, a flow diagram is shown depicting the steps of the method of transporting and reorienting items between two locations. The steps include forming a frame 18 having first and second upstanding members, 20 and 22 respectively, each having a first end, 24 and 28 respectively, and a second end, 26 and 30 respectively. The first and second upstanding members, 20 and 22 respectively, are joined together at their first ends, 24 and 28 respectively, by a third member 32. A track 34 is then formed within said first, second and third members, 20, 22 and 32 respectively. The track 34 defines a path 36 which spans at least 180 degrees and preferably 360 degrees. The method further includes mounting a set of four sprockets 38, 40, 42 and 44 to the frame 18 which will interact with the track 34. A movable member 46 is then positioned within the track 34 and is looped around the set of four sprockets 38, 40, 42 and 44. The method also includes securing an integral carrier 48 to the movable member 46. The integral carrier 48 has first and second members, 50 and 52 respectively, each having a first end, 54 and 56 respectively. A third member 58 is affixed to the first ends, 54 and 56 respectively, of the first and second members 50 and 52 to form a nonadjustable, approximately C-shaped configuration wherein the first and second members 50 and 52 are permanently spaced apart from one another and aligned in a parallel relationship.

The method further includes driving one of the set of four sprockets 38, 40, 42 and 44 by a power unit 60. The power unit 60 is activated and deactivated by a controller 64 at set time intervals to transport and reorient the integral carrier 48 between a first location 14 and a second location 16. The power unit 60 can be connected to one of the sprockets 38, 40, 42 and 44 so that the sprocket can be rotated in either a clockwise or counter clockwise direction. The power unit 60 can also be operated to either continuously or intermittently drive the one of the sprockets 38, 40, 42 and 44.

It should be noted that the method of transporting and reorienting the items will cause the integral carrier 48 to be inverted between the two locations 14 and 16. In one embodiment, the integral carrier 48 is oriented 90 degrees when moving from an initial starting position at the first location 14 to an intermediate position and is then oriented another 90 degrees when moving from the intermediate position to a final position at the second location 16.

While the invention has been described in conjunction with a number of specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. An apparatus for transporting and reorienting items between two locations, said apparatus comprising:
   a) a frame having first and second upstanding members each having a first end and a second end, said first and second upstanding members being joined together at said first ends by a third frame member;
   b) a track formed in said first and second upstanding members and said third frame member which defines a path which spans at least 180 degrees;
   c) a set of six sprockets interacting with said track;
   d) a movable member is positioned within said track and is looped about said set of six sprockets wherein said movable member is a continuous roller chain;
   e) an integral carrier secured to said movable member, said integral carrier having first and second members each having a first end, and a third member affixed to said first ends of said first and second members to form a nonadjustable, approximately C-shaped configuration wherein said first and second members are permanently spaced apart from one another and aligned in a parallel relationship;

f) power means for driving one of said sprockets;

g) control means for activating and deactivating said power means at set time intervals to transport and reorient said integral carrier between said first and second locations; and h) a tensioner connected to one of said six sprockets wherein said tensioner functions to maintain a desired tension in said roller chain.

2. The apparatus of claim 1 wherein said first and second members of said integral carrier each have a greater length than said third member.

3. The apparatus of claim 2 wherein said first and second members of said integral carrier are separated by a distance of at least about 10 inches.

4. The apparatus of claim 3 wherein said first and second members of said integral carrier are separated by a distance of between about 12 inches to about 24 inches.

5. The apparatus of claim 2 wherein each of said first and second members of said integral carrier extend outward from said third member by a distance of at least about 15 inches.

6. The apparatus of claim 1 wherein said movable member is a continuous chain.

7. The apparatus of claim 6 wherein said movable member is a roller chain.

8. The apparatus of claim 6 wherein there are six sprockets and said roller chain forms a continuous loop around all six sprockets.

9. An apparatus for transporting and reorienting items between tow locations, said apparatus comprising:

a) a frame including first, second, third and fourth upstanding members each having a first end and a second end, said first and second upstanding members being joined together at said first ends by a fifth member and said third and fourth upstanding members being joined together at said first ends by a sixth member, said fifth and sixth members each having a first end and a second end, a seventh member joining said first end of said fifth member to said first end of said sixth member and an eighth member joining said second end of said fifth member to said second end of said sixth member to form a parallelogram;

b) a horizontal platform secured to said first, second, third and fourth upstanding members, said platform being located closer to said second ends of said first, second, third and fourth members than to said first ends of said first, second, third and fourth members and wherein said platform is spaced a sufficient distance from said fifth, sixth, seventh and eighth members to permit a human operator to stand therein;

c) a pair of tracks formed in said first, second third and fourth upstanding members and said fifth and sixth members which define a pair of paths each of which spans at least 180 degrees, said pair of tracks extending below said platform;

d) two sets of four sprockets, one set of sprockets interacting with one of said pair of tracks and said other set of sprockets interacting with said other track, one sprocket of each set being a drive sprocket and the other three sprockets of each set being idler tension sprockets;

e) a pair of movable members, each movable member being positioned within one of said pair of tracks and each movable member engaging one of said sets of four sprockets to form a continuous closed loop;

f) an integral carrier secured to said pair of movable member in a fashion which permits said integral carrier to reorient itself through a predetermined path of at least 180 degrees, said integral carrier having first and second members each having a first end, and a third member affixed to said first ends of said first and second members to form a nonadjustable, approximately C-shaped configuration wherein said first and second members are permanently spaced apart from one another and aligned in a parallel relationship;

g) power means for driving said pair of drive sprockets; and h) control means for activating and deactivating said power means at set time intervals to transport and reorient said carrier between said first and second locations at a predetermined speed.

10. The apparatus of claim 9 wherein two sprockets of each set of sprockets are positioned below said platform and said pair of movable members include a pair of continuous roller chains.

11. The apparatus of claim 10 wherein each of said pair of roller chains includes a pair of outwardly extending pins and said third member of said integral carrier contains a pair of spaced apart apertures located adjacent to said first member and a pair of spaced apart slots located adjacent to said second member, two of said pins engaging said pair of apertures and two of said pins engaging said pair of slots, said pins securing said integral carrier to said pair of roller chains and enabling said integral carrier to move along said predetermined path.

12. The apparatus of claim 9 wherein said integral carrier is inverted between said first location and said second location.

13. An apparatus for transporting and reorienting items between tow locations, said apparatus comprising:

a) a frame including first, second, third and fourth upstanding members each having a first end and a second end, said first and second upstanding members being joined together at said first ends by a fifth member and said third and fourth upstanding members being joined together at said first ends by a sixth member, said fifth and sixth members each having a first end and a second end, a seventh member joining said first end of said fifth member to said first end of said sixth member and an eighth member joining said second end of said fifth member to said second end of said sixth member to form a parallelogram;

b) a horizontal platform secured to said first, second, third and fourth upstanding members, said platform being located closer to said second ends of said first, second, third and fourth members than to said first ends of said first, second, third and fourth members;

c) a pair of tracks formed in said first, second third and fourth upstanding members and said fifth and sixth members which define a pair of paths each of which spans at least 180 degrees, said pair of tracks extending below said platform;

d) two sets of four sprockets, one set of sprockets interacting with one of said pair of tracks and said other set of sprockets interacting with said other track, one sprocket of each set being a drive sprocket and the other three sprockets of each set being idler tension sprockets;

e) a pair of movable members, each movable member being positioned within one of said pair of tracks and each movable member engaging one of said sets of four sprockets to form a continuous closed loop;

f) an integral carrier secured to said pair of movable member in a fashion which permits said integral carrier to reorient itself through a predetermined path of at least 180 degrees, said integral carrier having first and second members each having a first end, and a third member affixed to said first ends of said first and second members to form a nonadjustable, approximately C-shaped configuration wherein said first and second members are permanently spaced apart from one another and aligned in a parallel relationship;

g) power means for driving said pair of drive sprockets; and h) control means for activating and deactivating said power means at set time intervals to transport and reorient said carrier between said first and second locations at a predetermined speed, wherein two sprockets of each set of sprockets are positioned below said platform and said pair of movable members include a pair of continuous roller chains.

14. The apparatus of claim 13 wherein said platform is spaced a sufficient distance from said fifth, sixth, seventh and eighth members to permit a human operator to stand therein.

15. The apparatus of claim 13 wherein each of said pair of roller chains includes a pair of outwardly extending pins and said third member of said integral carrier contains a pair of spaced apart apertures located adjacent to said first member and a pair of spaced apart slots located adjacent to said second member, two of said pins engaging said pair of apertures and two of said pins engaging said pair of slots, said pins securing said integral carrier to said pair of roller chains and enabling said integral carrier to move along said predetermined path.

16. The apparatus of claim 13 wherein said integral carrier is inverted between said first location and said second location.

17. An apparatus for transporting and reorienting items between tow locations, said apparatus comprising:

a) a frame including first, second, third and fourth upstanding members each having a first end and a second end, said first and second upstanding members being joined together at said first ends by a fifth member and said third and fourth upstanding members being joined together at said first ends by a sixth member, said fifth and sixth members each having a first end and a second end, a seventh member joining said first end of said fifth member to said first end of said sixth member and an eighth member joining said second end of said fifth member to said second end of said sixth member to form a parallelogram;

b) a horizontal platform secured to said first, second, third and fourth upstanding members, said platform being located closer to said second ends of said first, second, third and fourth members than to said first ends of said first, second, third and fourth members;

c) a pair of tracks formed in said first, second third and fourth upstanding members and said fifth and sixth members which define a pair of paths each of which spans at least 180 degrees, said pair of tracks extending below said platform;

d) two sets of four sprockets, one set of sprockets interacting with one of said pair of tracks and said other set of sprockets interacting with said other track, one sprocket of each set being a drive sprocket and the other three sprockets of each set being idler tension sprockets wherein two sprockets of each set of sprockets are positioned below said platform and said pair of movable members include a pair of continuous roller chains;

e) a pair of movable members, each movable member being positioned within one of said pair of tracks and each movable member engaging one of said sets of four sprockets to form a continuous closed loop;

f) an integral carrier secured to said pair of movable member in a fashion which permits said integral carrier to reorient itself through a predetermined path of at least 180 degrees, said integral carrier having first and second members each having a first end, and a third member affixed to said first ends of said first and second members to form a nonadjustable, approximately C-shaped configuration wherein said first and second members are permanently spaced apart from one another and aligned in a parallel relationship;

g) power means for driving said pair of drive sprockets; and h) control means for activating and deactivating said power means at set time intervals to transport and reorient said carrier between said first and second locations at a predetermined speed, wherein each of said pair of roller chains includes a pair of outwardly extending pins and said third member of said integral carrier contains a pair of spaced apart apertures located adjacent to said first member and a pair of spaced apart slots located adjacent to said second member, two of said pins engaging said pair of apertures and two of said pins engaging said pair of slots, said pins securing said integral carrier to said pair of roller chains and enabling said integral carrier to move along said predetermined path.

18. The apparatus of claim 17 wherein said platform is spaced a sufficient distance from said fifth, sixth, seventh and eighth members to permit a human operator to stand therein.

19. The apparatus of claim 17 wherein said integral carrier is inverted between said first location and said second location.

* * * * *